United States Patent
Li (10) Patent No.: US 11,983,400 B2
(45) Date of Patent: May 14, 2024

(54) CONTENT EXTRACTION METHOD, ELECTRONIC DEVICE AND MEDIUM

(71) Applicant: VIVO MOBILE COMMUNICATION CO., LTD., Dongguan (CN)

(72) Inventor: Song Li, Hangzhou (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 0 days.

(21) Appl. No.: 18/225,433

(22) Filed: Jul. 24, 2023

(65) Prior Publication Data

US 2024/0004541 A1    Jan. 4, 2024

Related U.S. Application Data

(63) Continuation of application No. PCT/CN2022/073823, filed on Jan. 25, 2022.

(30) Foreign Application Priority Data

Jan. 25, 2021    (CN) .......................... 202110098927.3

(51) Int. Cl.
  *G06F 3/0488*    (2022.01)
  *G06F 3/041*    (2006.01)
  (Continued)

(52) U.S. Cl.
  CPC ........ *G06F 3/0488* (2013.01); *G06F 3/04186* (2019.05); *G06F 9/451* (2018.02); *G06F 16/9535* (2019.01)

(58) Field of Classification Search
  CPC .... G06F 3/0488; G06F 3/04186; G06F 9/451; G06F 16/9535; G06F 3/0482; G06F 3/04886
  See application file for complete search history.

(56) References Cited

U.S. PATENT DOCUMENTS

2013/0187880 A1\*  7/2013  Tseng .................... G06F 40/221
                                                                                  345/173
2018/0143758 A1  5/2018  Pangasa et al.
(Continued)

FOREIGN PATENT DOCUMENTS

CN           106527945 A      3/2017
CN           109739416 A      5/2019
(Continued)

*Primary Examiner* — Jonathan A Boyd
(74) *Attorney, Agent, or Firm* — The Webb Law Firm (57) ABSTRACT

A content extraction method includes in the case that the target interface is displayed on the screen of the electronic device, if the target touch input of the user on the screen is received, obtaining target coordinates, where the target coordinates are coordinates of the selected target position in the target interface, and the target position corresponds to the touch position of the target touch input on the screen; obtaining node information of at least one node in the target interface, where the node information of a node includes node coordinates of the node and the content indicated by the node; determining a target node according to the target coordinates and the node information of the at least one node, where the node coordinates of the target node match the target coordinates; and extracting the target content included in the target interface and indicated by the target node.

20 Claims, 2 Drawing Sheets (51) Int. Cl.
*G06F 9/451* (2018.01)
*G06F 16/9535* (2019.01)

(56) References Cited

U.S. PATENT DOCUMENTS

| | | | |
|---|---|---|---|
| 2019/0080175 A1* | 3/2019 | Buratti | G06V 10/235 |
| 2020/0242186 A1* | 7/2020 | Yang | G06F 16/9574 |
| 2022/0012421 A1* | 1/2022 | Yuan | G06F 40/151 |

FOREIGN PATENT DOCUMENTS

| | | |
|---|---|---|
| CN | 111124888 A | 5/2020 |
| CN | 112817514 A | 5/2021 |

\* cited by examiner

CONTENT EXTRACTION METHOD, ELECTRONIC DEVICE AND MEDIUM

CROSS-REFERENCE TO RELATED APPLICATIONS

This application is a Bypass Continuation application of International Patent Application No. PCT/CN2022/073823 filed Jan. 25, 2022, and claims priority to Chinese Patent Application No. 202110098927.3 filed Jan. 25, 2021, the disclosures of which are hereby incorporated by reference in their entireties.

BACKGROUND OF THE INVENTION

Field of the Invention

The embodiments of the present application relate to the technical field of communication, and in particular, to a content extraction method, an electronic device and a non-transitory readable storage medium.

Description of Related Art

In the process of browsing a webpage by a user through an electronic device, if the user is interested in the content (such as a text or a picture) in the webpage, the user can long press a corresponding position of the content on a screen, thereby triggering the electronic device to extract the content.

SUMMARY OF THE INVENTION

According to a first aspect, the embodiment of the present application provides a content extraction method, and the method includes: in a case that a target interface is displayed on a screen of an electronic device, if a target touch input from a user on the screen is received, obtaining target coordinates, where the target coordinates are coordinates of a selected target position in the target interface, and the target position corresponds to a touch position of the target touch input on the screen; obtaining node information of at least one node in the target interface, where node information of a node includes node coordinates of the node and content indicated by the node; determining a target node according to the target coordinates and the node information of the at least one node, where node coordinates of the target node match the target coordinates; and extracting target content included in the target interface and indicated by the target node.

According to a second aspect, the embodiment of the present application provides a content extraction apparatus, and the content extraction apparatus includes: an obtaining module, a determination module, and a processing module. The obtaining module is configured to: in a case that a target interface is displayed on a screen of an electronic device, if a target touch input from a user on the screen is received, obtain target coordinates, where the target coordinates are coordinates of a selected target position in the target interface, and the target position corresponds to a touch position of the target touch input on the screen. The obtaining module is further configured to obtain node information of at least one node in the target interface, where node information of a node includes node coordinates of the node and content indicated by the node. The determination module is configured to determine a target node according to the target coordinates obtained by the obtaining module and the node information of the at least one node, where node coordinates of the target node match the target coordinates. The processing module is configured to extract target content included in the target interface and indicated by the target node determined by the determination module.

According to a third aspect, the embodiment of the present application provides an electronic device, the electronic device includes a processor, a memory, and a program or instruction stored in the memory and executable on the processor. When the program or instruction is executed by the processor, the steps of the method in the first aspect are performed.

According to a fourth aspect, the embodiment of the present application provides a non-transitory readable storage medium. The non-transitory readable storage medium stores a program or an instruction, and when the program or the instruction is executed by a processor, the steps of the method in the first aspect are performed.

According to a fifth aspect, the embodiments of the present application provide a chip, where the chip includes a processor and a communications interface, the communications interface is coupled to the processor, and the processor is configured to run a program or an instruction, to perform the method in the first aspect.

DESCRIPTION OF THE INVENTION

The following clearly describes the technical solutions in the embodiments of the present application with reference to the accompanying drawings in the embodiments of the present application. Apparently, the described embodiments are some rather than all of the embodiments of the present application. Based on the embodiments of the present application, all other embodiments obtained by a person of ordinary skill in the art fall within the protection scope of the present application.

The terms "first", "second", and the like in the description and the claims of the present application are used to distinguish between similar objects, and do not need to be used to describe a specific order or sequence. It should be understood that data used in this way may be interchangeable in appropriate cases, so that the embodiments of the present application can be implemented in a sequence other than those shown or described herein. In addition, in the specification and the claims, "and/or" represents at least one of connected objects, and a character "l" generally represents an "or" relationship between associated objects.

In the embodiments of the present application, the word such as "example" or "for example" is used to represent giving an example, an illustration, or a description. Any embodiment or design scheme described as "exemplary" or "an example" in the embodiments of the present application should not be construed as being preferable or advantageous than other embodiments or design schemes. Exactly, use of the word "example" or "for example" is intended to present a concept in a specific manner.

In the description of the embodiments of the present application, unless otherwise specified, the meaning of "multiple" means two or more. For example, multiple contents mean two or more contents.

The following describes some terms/nouns used in the embodiments of the present application.

A webview refers to a webpage view, and the external form of the webview is a webpage. In the embodiments of the present application, the webview can be understood as a webpage.

Javascript is a webpage scripting language and can be referred to as JS for short. In this embodiment of the present application, the target interface may include injected or implanted JS scripts.

A node is a container used to display a text, a picture, or the like in the interface. In the embodiments of the present application, an interface displayed on the screen of the electronic device may include at least one node, and a node is used to indicate a content in the interface. For example, if the interface is a webpage interface, a node is used to indicate a text in the webpage interface.

At present, in the process of extracting content by the electronic device, the electronic device can determine the to-be-extracted content by converting coordinates of the webpage end into coordinates of the screen end and then comparing these coordinates with coordinates input by the user on the screen.

However, through the above process, since the coordinate system used by the screen end is different from the coordinate system used by the webpage end, there may be errors in the converted coordinates. As a result, to-be-extracted content determined based on the converted coordinates is inaccurate, which in turn makes the extracted content less accurate.

The embodiment of the present application provides a content extraction method and apparatus. In the case that the target interface is displayed on the screen of the electronic device, if the target touch input of the user on the screen is received, the target coordinates are obtained, where the target coordinates are coordinates of the selected target position in the target interface, and the target position corresponds to the touch position of the target touch input on the screen; the node information of at least one node in the target interface is obtained, where the node information of a node includes node coordinates of the node and the content indicated by the node; the target node is determined according to the target coordinates and the node information of the at least one node, where the node coordinates of the target node match the target coordinates; and the target content included in the target interface and indicated by the target node is extracted. Through this solution, in the case that the target interface is displayed on the screen of the electronic device, when the user performs the target touch input on the screen, the coordinates of the selected target position that is in the target interface and that is corresponding to the touch position of the target touch input on the screen in the coordinate system of the target interface can be directly obtained, and there is no need to convert the coordinates of the target interface into the coordinates of the screen end. Therefore, the target node determined according to the target coordinates of the target position and the node information of at least one node of the target interface is more accurate, that is, the determined to-be-extracted content is more accurate, thereby avoiding the problem that the to-be-extracted content determined according to the converted coordinates is inaccurate due to possible errors in the converted coordinates. In this way, the accuracy of the extracted content is improved.

The content extraction method and apparatus and the electronic device provided by the embodiments of the present application will be described in detail below through specific embodiments and application scenarios with reference to the accompanying drawings.

Figure 1:
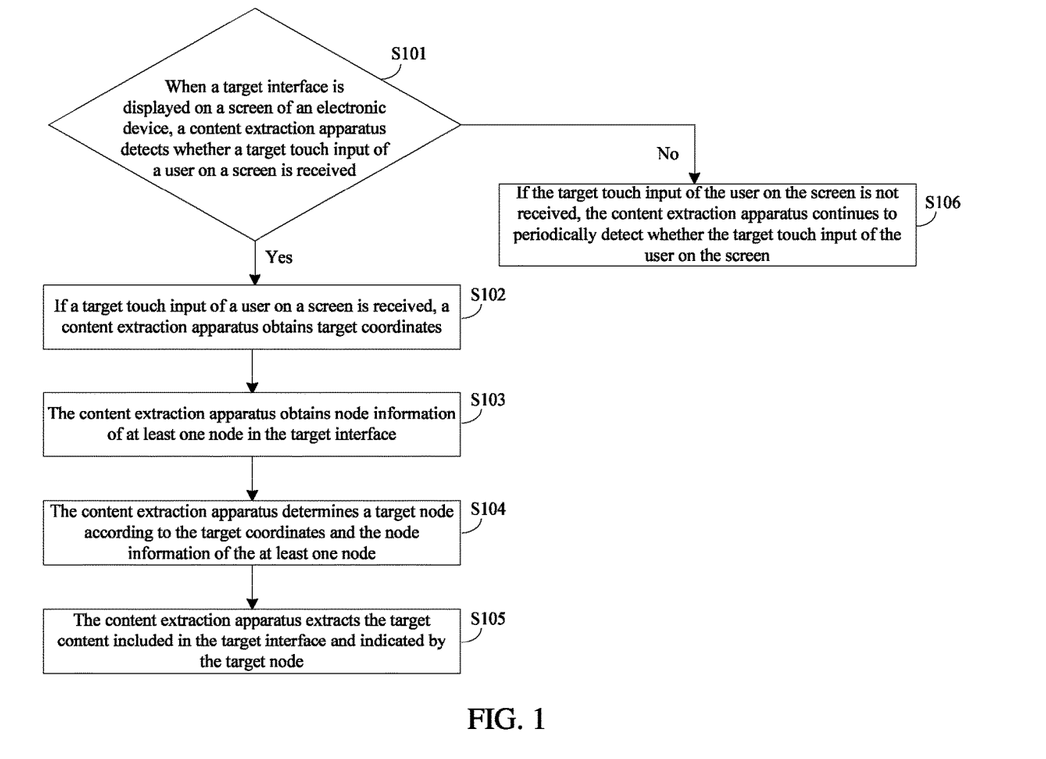
FIG. 1 is a first schematic diagram of a content extraction method provided in an embodiment of the present application.

As shown in FIG. 1, the embodiment of the present application provides a content extraction method, and the method includes the following S101 to S105.

S101. When a target interface is displayed on a screen of an electronic device, a content extraction apparatus detects whether a target touch input on the screen by a user is received.

Optionally, in the embodiment of the present application, the target interface may be a webpage interface, a picture interface, a document interface or other possible interfaces displayed on the screen of the electronic device, which is not limited in the embodiment of the present application.

Optionally, the target touch input may be factory-set by the electronic device, or be user-defined. It is determined according to actual conditions, which is not limited in this embodiment of the present application. For example, the target touch input is a long press touch input. It can be understood that, in the embodiment of the present application, the target touch input is used to trigger the execution of the content extraction method.

It should be noted that, after the above S101, the content extraction apparatus may perform operations according to detected results. For example, if the target touch input of the user on the screen is received, the following S102 is performed; or if the target touch input of the user on the screen is not received, the following S106 is performed.

Optionally, the electronic device provided in the embodiment of the present application has a content extraction function. When the user triggers the electronic device to enable the content extraction function, the electronic device may execute the content extraction method provided in the embodiment of the present application, that is, execute S101 to S105.

S102. If the target touch input of the user on the screen is received, the content extracting apparatus obtains target coordinates.

the target coordinates are the coordinates of the selected target position in the target interface, and the target position corresponds to the touch position of the target touch input on the screen.

Optionally, in the embodiment of the present application, the target coordinates may be coordinates of a target position obtained in another coordinate system (for example, a coordinate system used by the webpage end) different from the coordinate system used by the screen terminal of the electronic device.

In addition, the target position may be a target point on the target interface, or a display region on the target interface. It may be determined according to actual conditions, which is not limited in this embodiment of the present application.

Correspondingly, when the target position is a target point, the target coordinates are coordinates of the target point; when the target position is a display region, the target coordinates are coordinates of the center point of the display region. Reference may be made to the detailed description of the following embodiments, and the embodiments of the present application are not repeated herein.

Optionally, the above S102 may be implemented through the following S102A and S102B.

S102A. If the target touch input of the user on the screen is received, the content extracting apparatus determines, according to a correspondence between the screen and the target interface, the target position corresponding to the touch position.

It should be noted that, in the embodiment of the present application, in the case that an interface is displayed on an electronic device, a touch event on the interface is a communication mode from the view layer to the logic layer. The touch event feeds back the user's behavior to the logic layer for processing. The view layer is also called an interface layer and is located in the outermost layer (uppermost layer) and is closest to the user. The view layer is used to display data and receive data input by the user. The view layer provides users with an interactive operation interface. The logic layer is used to process the data and send the data to the view layer, and at the same time accept the event feedback of the view layer. In addition, the touch event can be bound to a component of the touch screen of the electronic device.

For example, when the electronic device detects that the target touch input of the user on the screen is received, the view layer can also receive the touch event triggered by the target touch input, so that the view layer can transfer the touch event to the logic layer, so that the electronic device can process an event object corresponding to the touch event in the logic layer, and at the same time obtain parameter information of the event object. The parameter information can include position information, an event object type, and the like.

Optionally, in the embodiment of the present application, multiple touch points are set on the screen of the electronic device. In the case that an interface (for example, a webpage) is displayed on the screen of the electronic device, multiple touch points can be mapped or projected on the interface to generate multiple target points, that is, the interface includes multiple target points, and a touch point corresponds to a target point. Correspondingly, a touch input on the screen may be the input of multiple touch points included in the touch position of the touch input on the screen.

Exemplarily, it is assumed that C1, C2, . . . Cn touch points are set on the screen of the electronic device, and the target interface displayed on the screen includes M1, M2, . . . Mn target points corresponding to the n touch points. C1 corresponds to M1, C2 corresponds to M2, . . . and Cn corresponds to Mn, that is, one touch point corresponds to one target point, and n is a positive integer greater than 1. In the case that the target touch input of the user on the screen is received, if the touch position of the target touch input on the screen includes touch points C5, C8, C9, and C12, it can be determined that positions corresponding to the touch positions in the target interface and including the target points M5, M8, M9, and M12 are the target positions.

S102B. The content extracting apparatus obtains target coordinates according to the target position.

Optionally, the target coordinates are coordinates of the selected target position in the target interface. In the case that the target position in the target interface is determined, the electronic device can calculate the target coordinates of the target position through a script tool.

It can be understood that, in the case that the target touch input of the user on the screen is received, the target position corresponding to the touch position can be determined directly according to the correspondence between the screen and the interface displayed on the screen, and the target coordinates of the target position can be obtained without conversion of the coordinate system, thereby avoiding the possible error problem of the converted coordinates, that is, improving the accuracy of the target coordinates.

Optionally, the target position is a display region in the target interface. Correspondingly, the above S102B can be implemented through the following steps (1) to (3).

Step (1). the content extracting apparatus obtains position information of a display region.

Optionally, the position information of the display region may include: information such as the width and height of the display region, the distance from the area to the top border of the target interface, the distance from the area to the bottom border of the target interface, the distance from the area to the left border of the target interface, and the distance from the area to the right boundary of the target interface. That is, the position information may be a coordinate interval (or a coordinate range).

It can be understood that, in the case that the target position is a display region in the target interface, the electronic device can obtain position information of the display region by running a script tool.

Step (2). The content extraction apparatus determines coordinates of the center point of the display region according to the position information.

Optionally, in this embodiment of the present application, the coordinates of the center point of a display region may include: in the coordinate system of the target interface, horizontal coordinates and vertical coordinates of the center point and the position information of the center point. The position information of the center point includes the distance between the center point and the four borders of the target interface. Refer to the description in the foregoing embodiments, which will not be repeated in the embodiments of the present application.

Step (3). The content extracting apparatus uses the coordinates of the center point as the target coordinates.

Exemplarily, it is assumed that the content extraction apparatus is a mobile phone. When the target position is a display region in the target interface, the mobile phone can obtain the position information of the area by running the script tool, that is, a coordinate interval, so that the mobile phone can obtain the coordinates of the center point of the area through calculation. The following code is the coordinates of the center point of a display region:

DOMRect {x: 16, y: 303, width: 331, height: 91, top: 303, . . . }
bottom: 394
height: 91
left: 16
right: 347
top: 303
width: 331
x: 16
y: 303

It can be understood that, in the case that the target position is a display region, the content extraction apparatus may convert the display region into a point, thereby obtaining the coordinates of the point as the target coordinates, so that the target coordinates can be compared with node coordinates of at least one node later, and the selection of the target node is more accurate.

S103. The content extraction apparatus obtains node information of at least one node in the target interface.

The node information of a node includes node coordinates of the node and content indicated by the node.

Optionally, the above S103 includes: the content extraction apparatus obtains node information of each node of at least one node in the target interface.

Optionally, the target interface may include a target script, and the target script is used to obtain node information of each node in the target interface. Correspondingly, the above S103 may be implemented through the following S103A.

S103A. The content extraction apparatus obtains node information of at least one node by running the target script.

It should be noted that, for example, the target interface is a webpage, and during the front-end development process of the webpage, those skilled in the art can use Android to inject or implant a target script with self-running capability, such as Js script, into the webpage webview. This method belongs to the native capability provided by android. In android, the functions registered in webview can be invoked to achieve the purpose of communication between android and webview.

In addition, in the embodiment of the present application, the content extraction apparatus can first traverse, according to the general operation capability of the DOM in the webpage, all the nodes included in the webpage; then, by running the target script implanted in the webpage, obtain the node information of all nodes included in the webpage. The node information of a node may include content indicated by the node, node coordinates of the node, attribute information of the content indicated by the node, whether the content indicated by the node is selected, and the like. It can be understood that, when the user triggers the electronic device to display the target interface, the target script included in the target interface can be automatically run in the electronic device, so that node information of at least one node in the target interface can be obtained through the function in the target script.

Optionally, before the above S103A, the content extraction method provided in the embodiment of the present application may include: traversing or querying at least one node included in the target interface, where the node is used to indicate content included in the target interface. One node corresponds to one node information. It can be understood that different nodes are used to indicate different contents included in the target interface.

It can be understood that, in the case that the target interface can include a target script, since the target script has self-running capability, the node information of at least one node of the target interface can be directly obtained by running the target script, which improves the convenience of obtaining node information of at least one node of the target interface.

S104. The content extraction apparatus determines a target node according to the target coordinates and the node information of the at least one node.

The node coordinates of the target node match the target coordinates.

Optionally, the above S104 may be implemented through the following S104A and S104B.

S104A. The content extraction apparatus sequentially compares the target coordinates with the node coordinates of the at least one node.

S104B. The content extraction apparatus determines, from the at least one node, a node whose node coordinates match the target coordinates as the target node.

For example, the above S104A and S104B may be implemented through the following two possible implementation manners:

One possible implementation manner:

The content extraction apparatus compares the target coordinates with the node coordinates of each node of the at least one node, and selects the node whose node coordinates most match the target coordinates from the at least one node as the target node.

Another possible implementation manner:

The content extraction apparatus sequentially compares the target coordinates with the node coordinates of the at least one node, stops the comparison until the node coordinates of a compared node match the target coordinates, and uses the node as the target node.

It can be understood that by sequentially comparing the target coordinates with the node coordinates of the at least one node, the target node whose node coordinates match the target coordinates can be determined, that is, the to-be-extracted content can be determined, so that preparations for content extraction can be made.

S105. The content extraction apparatus extracts the target content included in the target interface and indicated by the target node.

Optionally, the target interface may include multiple contents, and the multiple contents may be the same type of content, or different types of content. The target content is the content in multiple contents.

Optionally, the target content may include at least one of the following: text, picture, video, audio, link, and so on.

It can be understood that, in the embodiment of the present application, the electronic device extracts, according to the target touch input of the user on the screen, the target content included in the target interface and indicated by the target node, where the target content includes content displayed at the selected target position that is in the target interface and that is corresponding to the touch position of the target touch input on the screen.

Exemplarily, the content extraction apparatus is a mobile phone. It is assumed that the target interface includes node 1, node 2, node 3, . . . , and node 12, and a node is used to indicate a content of the target interface. When the target interface is displayed on the screen of the mobile phone, if the user is interested in a line of text in the target interface, the user can long press a position corresponding to the line of text on the screen (that is, the touch position). When the mobile phone detects that the user's long press input (that is, the target touch input) is received, coordinates of the selected target position that is in the target interface and that is corresponding to the position, that is, the target coordinates, are obtained. The mobile phone obtains, by running the Js script in the target interface, the node information of node 1, node 1, node 3, . . . , and node 12 included in the target interface, and the node information of a node includes the node coordinates of the node and the content indicated by the node. The mobile phone sequentially compares the target coordinates with the node coordinates of node 1, node 2, node 3, . . . , and node 12, and selects the node 5 whose node coordinates matching the target coordinates from the 12 nodes as the target node, so that the mobile phone can extract a text included in the target interface indicated by the node 5, and the text includes the line of text that the user is interested in. It can be understood that the user can select desired content from the content indicated by the mobile phone extraction node according to actual needs.

S106. If the target touch input of the user on the screen is not received, the content extraction apparatus continues to periodically detect whether the target touch input of the user on the screen.

For example, the above S106 may include the following two situations A1 and A2:

A1. If the target touch input of the user on the screen is not received and no other touch input of the user on the screen is received, the content extraction apparatus continues to periodically detect whether the target touch input of the user on the screen.

A2. If the target touch input of the user on the screen is not received and another touch input of the user on the screen is received, the content extraction apparatus does not respond to the another touch input, and continues to periodically detect whether the target touch input of the user on the screen is received.

Exemplarily, it is assumed that the target touch input is a long press touch input. In the case of receiving input such as clicking, double-clicking or sliding on the screen of the electronic device by the user, since none of these inputs are a long-press touch input, the content extraction apparatus does not process these inputs.

It can be understood that, in the case of not receiving the target touch input of the user on the screen, the content extraction apparatus continues to periodically detect whether the target touch input of the user on the screen is received, so as to avoid missing a response to the target touch input of the user on the screen and also avoid responding to the irrelevant touch operation of the user on the screen, saving the operating resources of the electronic device.

An embodiment of the present application provides a content extraction method. In the case that the target interface is displayed on the screen of the electronic device, when the user performs the target touch input on the screen, the coordinates of the selected target position that is in the target interface and that is corresponding to the touch position of the target touch input on the screen in the coordinate system of the target interface can be directly obtained, and there is no need to convert the coordinates of the target interface into the coordinates of the screen end. Therefore, the target node determined according to the target coordinates of the target position and the node information of at least one node of the target interface is more accurate, that is, the determined to-be-extracted content is more accurate, thereby avoiding the problem that the to-be-extracted content determined according to the converted coordinates is inaccurate due to possible errors in the converted coordinates. This improves the accuracy of extracted content.

Optionally, the node information of a node may further include attribute information of content indicated by the node. Correspondingly, after the above S105, the content extraction method provided in the embodiment of the present application may further include the following S107.

S107. The content extracting apparatus displays prompt information according to attribute information of the target content.

The prompt information is used to prompt performing of a target operation on the target content. The target operation includes at least one of the following: searching for content related to the target content, sharing the target content with target objects, copying the target content, or saving the target content.

Optionally, the attribute information is used to indicate an attribute of the target content. For different types of target content, the attribute information is correspondingly different.

For example, if the target content is text content, the attribute information is a text format, a text browsing method, or the like; if the target content is a video, the attribute information is a video format, a video playback method, or the like; and if the target content is a network link, the attribute information is a link type, a link opening method, or the like.

Optionally, the prompt information may include at least one control, and one control is used to trigger a target operation. For example, the prompt information includes a search control, a share control, a copy control, and a save control.

It can be understood that, for different types of target content, since the attribute information is different, according to the attribute information, the target operation performed on the target content and prompted by the displayed prompt information may also be different.

In the content extraction method provided by the embodiment of the present application, when node information of a node includes the attribute information of the content indicated by the node, since prompt information for prompting to perform an operation on the target content such as searching, sharing, copying, or saving operations may be displayed according to the attribute information of the target content, users can trigger searching, sharing, copying, or saving of the target content according to their actual needs. In this way, the extracted target content can be utilized to meet user needs.

It should be noted that, the content extraction method provided in the embodiment of the present application may be executed by a content extraction apparatus (for example, the content extraction apparatus is an electronic device, or an external device on the electronic device), or a control module for executing a content extraction method in the content extraction apparatus. In the embodiment of the present application, the content extraction apparatus provided in the embodiment of the present application is described by taking the execution of the content extraction method by the content extraction apparatus as an example.

Figure 2:
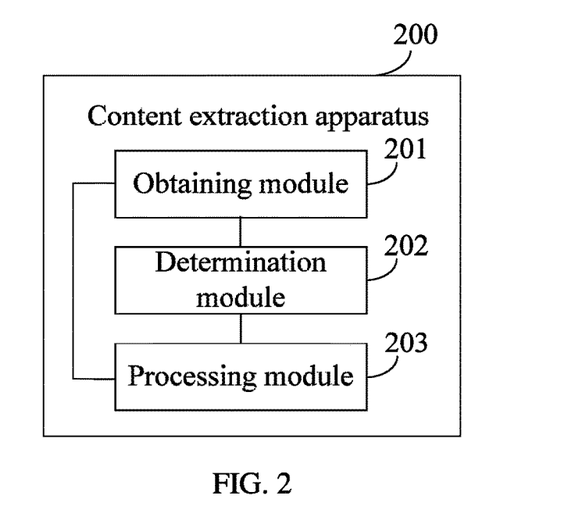
FIG. 2 is a schematic structural diagram of a content extraction apparatus provided in an embodiment of the present application.

As shown in FIG. 2, the embodiment of the present application provides a content extraction apparatus 200, which may include an obtaining module 201, a determination module 202, and a processing module 203. The obtaining module 201 may be configured to: in a case that a target interface is displayed on a screen of an electronic device, if a target touch input from a user on the screen is received, obtain target coordinates, where the target coordinates are coordinates of a selected target position in the target interface, and the target position corresponds to a touch position of the target touch input on the screen; and obtain node information of at least one node in the target interface, where node information of a node includes node coordinates of the node and content indicated by the node. The determination module 202 may be configured to determine a target node according to the target coordinates obtained by the obtaining module 201 and the node information of the at least one node, where node coordinates of the target node match the target coordinates. The processing module 203 may be configured to extract target content included in the target interface and indicated by the target node determined by the determination module 202.

Optionally, the determination module 202 can be specifically configured to determine, according to the correspondence between the screen and the target interface, the target position corresponding to the touch position, and the obtaining module 201 can be specifically configured to obtain target coordinates according to the target position determined by the determination module 202.

Optionally, the target position is a display region in the target interface. The obtaining module 201 may be specifically configured to obtain the position information of the display region. The determination module 202 may be specifically configured to determine coordinates of the center point of the display region according to the position information obtained by the obtaining module 201; and use the coordinates of the center point as target coordinates.

Optionally, the processing module 203 may also be configured to sequentially compare the target coordinates with the node coordinates of at least one node. The determination module 202 may be specifically configured to determine, from the at least one node, a node whose node coordinates match the target coordinates as the target node.

Optionally, the target interface includes a target script for obtaining node information of each node in the target interface. The obtaining module 201 may be specifically configured to obtain node information of at least one node by running the target script.

Optionally, the node information of a node further includes attribute information of content indicated by the node. The content extraction apparatus may further include a display module 204. The display module 204 is configured to display prompt information according to the attribute information of the target content after the processing module 203 extracts the target content included in the target interface and indicated by the target node, where the prompt information is used to prompt performing of a target operation on the target content. The target operation includes at least one of the following: searching for content related to the target content, sharing the target content with target objects, copying the target content, or saving the target content.

An embodiment of the present application provides a content extraction apparatus. In the case that the target interface is displayed on the screen of the electronic device, when the user performs the target touch input on the screen, the coordinates of the selected target position that is in the target interface and that is corresponding to the touch position of the target touch input on the screen in the coordinate system of the target interface can be directly obtained by the content extraction apparatus, and there is no need to convert the coordinates of the target interface into the coordinates of the screen end. Therefore, the target node determined according to the target coordinates of the target position and the node information of at least one node of the target interface is more accurate, that is, the determined to-be-extracted content is more accurate, thereby avoiding the problem that the to-be-extracted content determined according to the converted coordinates is inaccurate due to possible errors in the converted coordinates. In this way, the accuracy of the extracted content is improved.

The content extraction apparatus in the embodiments of the present application may be an apparatus, or may be a component, an integrated circuit, or a chip in a terminal. The apparatus may be a mobile electronic device, or may be a non-mobile electronic device. For example, the mobile electronic device may be a mobile phone, a tablet computer, a laptop computer, a palmtop computer, an in-vehicle electronic device, a wearable device, an ultra-mobile personal computer (UMPC), a netbook, or a personal digital assistant (PDA). The non-mobile electronic device may be a server, a network attached storage (NAS), a personal computer (PC), a television (TV), an automated teller machine, or a self-service machine. This is not specifically limited in the embodiments of the present application.

The content extraction apparatus in the embodiments of the present application may be an apparatus with an operating system. The operating system may be an Android operating system, an iOS operating system, or another possible operating system. This is not specifically limited in this embodiment of the present application.

The content extraction apparatus provided in this embodiment of the present application can implement each process in the method embodiments of FIG. 1. To avoid repetition, details are not described herein again.

Figure 3:
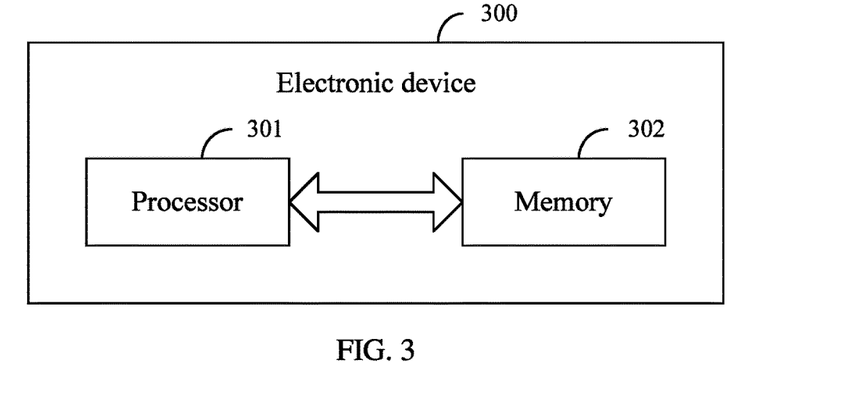
FIG. 3 is a schematic structural diagram of an electronic device provided in an embodiment of the present application.

Optionally, as shown in FIG. 3, the embodiments of the present application further provide an electronic device 300, including a processor 301, a memory 302, and a program or instruction stored in the memory 302 and executable on the processor 301, When the program or instruction is executed by the processor 301, each process of the content extraction method embodiment described above can be realized, and the same technical effect can be achieved. To avoid repetition, details are not repeated herein.

It should be noted that the electronic device in this embodiment of the present application includes the foregoing mobile electronic device and the foregoing non-mobile electronic device.

Figure 4:
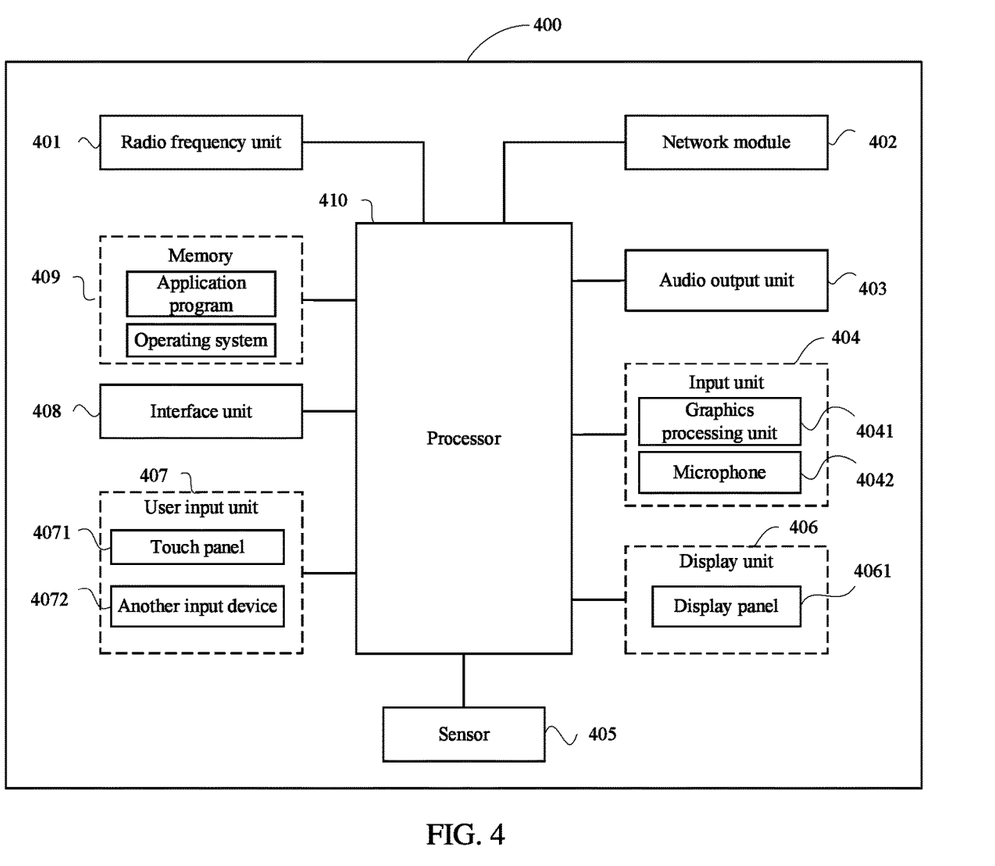
FIG. 4 is a schematic diagram of hardware of an electronic device provided in an embodiment of the present application.

FIG. 4 is a schematic diagram of a hardware structure of an electronic device for implementing embodiments of the present application.

The electronic device 400 includes, but is not limited to: a radio frequency unit 401, a network module 402, an audio output unit 403, an input unit 404, a sensor 405, a display unit 406, a user input unit 407, an interface unit 408, a memory 409, a processor 410, and the like.

It may be understood by a person skilled in the art that the electronic device 400 may further include a power supply (such as a battery) that supplies power to each component. The power supply may be logically connected to the processor 410 by using a power management system, to implement functions such as charging, discharging, and power consumption management by using the power management system. A structure of the electronic device shown in FIG. 4 does not constitute a limitation on the electronic device, and may include more or fewer parts than those shown in the figure, or combine some components, or have different part arrangements. Details are not described herein again.

The processor 410 is configured to: in the case that the target interface is displayed on the screen of the electronic device, if the target touch input of the user on the screen is received by the user input unit 407, obtain the target coordinates, where the target coordinates are coordinates of the selected target position in the target interface, and the target position corresponds to the touch position of the target touch input on the screen; obtain the node information of at least one node in the target interface, where the node information of a node includes node coordinates of the node and the content indicated by the node; determine the target node according to the target coordinates and the node information of the at least one node, where the node coordinates of the target node match the target coordinates; and extract the target content included in the target interface and indicated by the target node.

Optionally, the processor 410 is specifically configured to determine, according to the correspondence between the screen and the target interface, a target position corresponding to the touch position; and obtain target coordinates according to the target position.

Optionally, the target position is a display region in the target interface, and the processor 410 is specifically configured to obtain position information of the display region; determine the coordinates of the center point of the display region according to the position information; and use coordinates of the center point as the target coordinates.

Optionally, the processor 410 is further configured to sequentially compare the target coordinates with the node coordinates of at least one node; and determine, from the at least one node, a node whose node coordinates match the target coordinates as the target node.

Optionally, the target interface includes a target script for obtaining node information of each node in the target interface. The processor 410 is specifically configured to obtain node information of at least one node by running the target script.

Optionally, the node information of a node further includes attribute information of content indicated by the node. The display unit 406 is configured to display prompt information according to the attribute information of the target content after the processor 410 extracts the target content included in the target interface and indicated by the target node, where the prompt information is used to prompt performing of a target operation on the target content. The target operation includes at least one of the following: searching for content related to the target content, sharing the target content with target objects, copying the target content, or saving the target content.

An embodiment of the present application provides an electronic device. In the case that the target interface is displayed on the screen of the electronic device, when the user performs the target touch input on the screen, the coordinates of the selected target position that is in the target interface and that is corresponding to the touch position of the target touch input on the screen in the coordinate system of the target interface can be directly obtained by the electronic device, and there is no need to convert the coordinates of the target interface into the coordinates of the screen end. Therefore, the target node determined according to the target coordinates of the target position and the node information of at least one node of the target interface is more accurate, that is, the determined to-be-extracted content is more accurate, thereby avoiding the problem that the to-be-extracted content determined according to the converted coordinates is inaccurate due to possible errors in the converted coordinates. In this way, the accuracy of the extracted content is improved.

It should be understood that, in this embodiment of the present application, the input unit 404 may include a graphics processing unit (GPU) 4041 and a microphone 4042, and the graphics processing unit 4041 processes image data of a still picture or a video obtained by an image capture apparatus (such as a camera) in a video capture mode or an image capture mode. The display unit 406 may include a display panel 4061. Optionally, the display panel 4061 may be configured in a form such as a liquid crystal display or an organic light-emitting diode. The user input unit 407 includes a touch panel 4071 and another input device 4072. The touch panel 4071 is also referred to as a touchscreen. The touch panel 4071 may include two parts: a touch detection apparatus and a touch controller. The another input device 4072 may include but is not limited to a physical keyboard, a functional button (such as a volume control button or a power on/off button), a trackball, a mouse, and a joystick. Details are not described herein. The memory 409 may be configured to store a software program and various data, including but not limited to an application program and an operating system. The processor 410 may be integrated with an application processor and a modem processor. The application processor mainly processes an operating system, a user interface, an application program, and the like. The modem processor mainly processes wireless communication. It can be understood that, alternatively, the modem processor may not be integrated into the processor 410.

An embodiment of the present application further provides a non-transitory readable storage medium. The non-transitory readable storage medium stores a program or an instruction, and when the program or the instruction is executed by a processor, the various processes of the foregoing content extraction method embodiment is performed and the same technical effects can be achieved. To avoid repetition, details are not described herein again.

The processor is a processor in the electronic device in the above embodiment. The non-transitory readable storage medium includes a non-transitory computer-readable storage medium, such as a computer read-only memory (ROM), a random access memory (RAM), a magnetic disk, or an optical disc.

An embodiment of the present application further provides a chip, the chip includes a processor and a communication interface, the communication interface is coupled to the processor, and the processor is configured to run programs or instructions to implement each process of the embodiment of the foregoing content extraction method and the same technical effects can be achieved. To avoid repetition, details are not described herein again.

It should be understood that the chip mentioned in this embodiment of the present application may also be referred to as a system-level chip, a system chip, a chip system, or a system on a chip.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "includes a . . . " does not, without more constraints, preclude the presence of additional identical elements in the process, method, article, or apparatus that includes the element. In addition, it should be noted that a scope of the method and the apparatus in the implementations of the present application is not limited to: performing a function in a sequence shown or discussed, and may further include: performing a function in a basically simultaneous manner or in a reverse sequence based on an involved function. For example, the described method may be performed in a different order, and various steps may be added, omitted, or combined. In addition, features described with reference to some examples may be combined in other examples.

Based on the descriptions of the foregoing implementations, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of the present application essentially, or the part contributing to the prior art may be implemented in a form of a software product. The computer software product is stored in a storage medium (for example, a ROM/RAM, a magnetic disk, or a compact disc), and includes multiple instructions for instructing a terminal (which may be a mobile phone, a computer, a server, an air conditioner, a network device, or the like) to perform the method described in the embodiments of the present application.

The embodiments of the present application are described with reference to the accompanying drawings. However, the present application is not limited to the foregoing specific implementations. The foregoing specific implementations are merely examples, but are not limiting. Under the enlightenment of the present application, a person of ordinary skill in the art may make many forms without departing from the objective and the scope of the claims of the present application, and these forms all fall within the protection scope of the present application.

What is claimed is:

1. A content extraction method, comprising:
in a case that a target interface is displayed on a screen of an electronic device, if a target touch input from a user on the screen is received, obtaining target coordinates, wherein the target coordinates are coordinates of a selected target position in the target interface, and the target position corresponds to a touch position of the target touch input on the screen;
obtaining node information of at least one node in the target interface, wherein node information of a node includes node coordinates of the node and content indicated by the node;
determining a target node according to the target coordinates and the node information of the at least one node, wherein node coordinates of the target node match the target coordinates; and
extracting target content included in the target interface and indicated by the target node.

2. The method according to claim 1, wherein the obtaining target coordinates comprises:
determining, according to a correspondence between the screen and the target interface, the target position corresponding to the touch position; and
obtaining the target coordinates according to the target position.

3. The method according to claim 2, wherein the target position is a display region in the target interface; and
the obtaining the target coordinates according to the target position comprises:
acquiring position information of the display region;
determining coordinates of a center point of the display region according to the position information; and
using the coordinates of the center point as the target coordinates.

4. The method according to claim 1, wherein the determining a target node according to the target coordinates and the node information of the at least one node comprises:
sequentially comparing the target coordinates with node coordinates of the at least one node; and
determining, from the at least one node, a node whose node coordinates match the target coordinates as the target node.

5. The method according to claim 1, wherein the target interface includes a target script, and the target script is used to obtain node information of each node in the target interface; and
the obtaining node information of at least one node in the target interface comprises:
obtaining the node information of the at least one node by running the target script.

6. The method according to claim 1, wherein the node information of the node further includes attribute information of the content indicated by the node; and
after the extracting target content indicated by the target node, the method further comprises:
displaying prompt information according to attribute information of the target content, wherein the prompt information is used to prompt performing of a target operation on the target content;
wherein the target operation comprises at least one of: searching for content related to the target content, sharing the target content with target objects, copying the target content, or saving the target content.

7. A computer software product stored in a non-transitory computer-readable storage medium, wherein the software product is executed by at least one processor to implement the content extraction method according to claim 1.

8. A chip, wherein the chip comprises a processor and a communication interface, the communication interface is coupled to the processor, and the processor is configured to run a program or an instruction, to perform the content extraction method according to claim 1.

9. An electronic device, comprising a processor, a memory, and a program or an instruction stored in the memory and executable on the processor, wherein the program or the instruction, when executed by the processor, causes the electronic device to perform:
in a case that a target interface is displayed on a screen of an electronic device, if a target touch input from a user on the screen is received, obtaining target coordinates, wherein the target coordinates are coordinates of a selected target position in the target interface, and the target position corresponds to a touch position of the target touch input on the screen;
obtaining node information of at least one node in the target interface, wherein node information of a node includes node coordinates of the node and content indicated by the node;
determining a target node according to the target coordinates and the node information of the at least one node, wherein node coordinates of the target node match the target coordinates; and
extracting target content included in the target interface and indicated by the target node.

10. The electronic device according to claim 9, wherein the program or the instruction, when executed by the processor, causes the electronic device to perform:
determining, according to a correspondence between the screen and the target interface, the target position corresponding to the touch position; and
obtaining the target coordinates according to the target position.

11. The electronic device according to claim 10, wherein the target position is a display region in the target interface; and
the program or the instruction, when executed by the processor, causes the electronic device to perform:
acquiring position information of the display region;
determining coordinates of a center point of the display region according to the position information; and
using the coordinates of the center point as the target coordinates.

12. The electronic device according to claim 9, wherein the program or the instruction, when executed by the processor, causes the electronic device to perform:
sequentially comparing the target coordinates with node coordinates of the at least one node; and
determining, from the at least one node, a node whose node coordinates match the target coordinates as the target node.

13. The electronic device according to claim 9, wherein the target interface includes a target script, and the target script is used to obtain node information of each node in the target interface; and the program or the instruction, when executed by the processor, causes the electronic device to perform:

obtaining the node information of the at least one node by running the target script.

14. The electronic device according to claim 9, wherein the node information of the node further includes attribute information of the content indicated by the node; and the program or the instruction, when executed by the processor, causes the electronic device to further perform:

displaying prompt information according to attribute information of the target content, wherein the prompt information is used to prompt performing of a target operation on the target content;

wherein the target operation comprises at least one of: searching for content related to the target content, sharing the target content with target objects, copying the target content, or saving the target content.

15. A non-transitory readable storage medium, storing a program or an instruction, wherein the program or the instruction, when executed by a processor of an electronic device, causes the electronic device to perform:

in a case that a target interface is displayed on a screen of an electronic device, if a target touch input from a user on the screen is received, obtaining target coordinates, wherein the target coordinates are coordinates of a selected target position in the target interface, and the target position corresponds to a touch position of the target touch input on the screen;

obtaining node information of at least one node in the target interface, wherein node information of a node includes node coordinates of the node and content indicated by the node;

determining a target node according to the target coordinates and the node information of the at least one node, wherein node coordinates of the target node match the target coordinates; and extracting target content included in the target interface and indicated by the target node.

16. The non-transitory readable storage medium according to claim 15, wherein the program or the instruction, when executed by the processor, causes the electronic device to perform:

determining, according to a correspondence between the screen and the target interface, the target position corresponding to the touch position; and obtaining the target coordinates according to the target position.

17. The non-transitory readable storage medium according to claim 16, wherein the target position is a display region in the target interface; and the program or the instruction, when executed by the processor, causes the electronic device to perform:

acquiring position information of the display region;

determining coordinates of a center point of the display region according to the position information; and using the coordinates of the center point as the target coordinates.

18. The non-transitory readable storage medium according to claim 15, wherein the program or the instruction, when executed by the processor, causes the electronic device to perform:

sequentially comparing the target coordinates with node coordinates of the at least one node; and determining, from the at least one node, a node whose node coordinates match the target coordinates as the target node.

19. The non-transitory readable storage medium according to claim 15, wherein the target interface includes a target script, and the target script is used to obtain node information of each node in the target interface; and the program or the instruction, when executed by the processor, causes the electronic device to perform:

obtaining the node information of the at least one node by running the target script.

20. The non-transitory readable storage medium according to claim 15, wherein the node information of the node further includes attribute information of the content indicated by the node; and the program or the instruction, when executed by the processor, causes the electronic device to further perform:

displaying prompt information according to attribute information of the target content, wherein the prompt information is used to prompt performing of a target operation on the target content;

wherein the target operation comprises at least one of: searching for content related to the target content, sharing the target content with target objects, copying the target content, or saving the target content.

* * * * *